United States Patent
Lilla et al.

(10) Patent No.: US 8,055,208 B2
(45) Date of Patent: Nov. 8, 2011

(54) LOW ENERGY DATA COMMUNICATION CIRCUIT FOR HAZARDOUS OR NONHAZARDOUS ENVIRONMENTS

(75) Inventors: Manfred Lilla, Messstetten (DE); Elmar Merk, Stetten am kalten Markt (DE); Arthur Towslee, Westerville, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 402 days.

(21) Appl. No.: 12/400,609

(22) Filed: Mar. 9, 2009

(65) Prior Publication Data

US 2010/0227568 A1    Sep. 9, 2010

(51) Int. Cl.
*H04B 7/00* (2006.01)
(52) U.S. Cl. .......................... 455/70; 455/73
(58) Field of Classification Search .............. 455/70–73; 375/219
See application file for complete search history.

(56) References Cited

U.S. PATENT DOCUMENTS

| | | | |
|---|---|---|---|
| 4,475,049 A | 10/1984 | Smith et al. | |
| 5,274,273 A * | 12/1993 | Baginski et al. | ................. 327/72 |
| 5,587,709 A | 12/1996 | Jeong | |
| 5,675,584 A | 10/1997 | Jeong | |
| 6,194,934 B1 * | 2/2001 | Detering | ......................... 327/165 |
| 6,417,790 B1 | 7/2002 | Fiedler et al. | |
| 7,915,873 B2 * | 3/2011 | Yen | ................. 323/224 |
| 2003/0169836 A1 | 9/2003 | Ebuchi et al. | |
| 2004/0100854 A1 | 5/2004 | Rahamim et al. | |

* cited by examiner

*Primary Examiner* — Dinh T. Le
(74) *Attorney, Agent, or Firm* — Standley Law Group LLP

(57) ABSTRACT

The present invention relates to a data communication circuit and system for use in hazardous or nonhazardous environments. In the preferred embodiment, the system is a bi-directional, low energy, current loop data communication circuit primarily for high speed data communications via parallel or twisted pair conductors. The system of the present invention can safely transmit data across long distances (e.g., up to 1000 feet (300 meters)) in an explosive atmosphere.

19 Claims, 3 Drawing Sheets

LOW ENERGY DATA COMMUNICATION CIRCUIT FOR HAZARDOUS OR NONHAZARDOUS ENVIRONMENTS

BACKGROUND OF THE INVENTIVE FIELD

The present invention relates to a data transmission circuit and system for use in hazardous or nonhazardous environments. In the preferred embodiment, the system is a bi-directional, low energy, current loop data communication circuit primarily for high speed data communications via parallel or twisted pair conductors. In the preferred embodiment, the system of the present invention can safely transmit data across distances up to 1000 feet (300 meters) in an explosive atmosphere. The circuit preferably allows multiple communication circuits to be contained within a single cable without crosstalk interference. Further protections can be provided by optically isolating a portion of the circuit for use in the hazardous area with the circuit for use in the safe area.

The present invention provides a safe communication circuit that can be used in a hazardous environment, e.g., one with fuel that is conducive to an explosive atmosphere. Traditionally, data communication circuits intended to transmit information at high speeds and across long distances required energy levels that may be unsafe for use in a hazardous environment. Accordingly, the present invention advances the state of the art by providing a novel method and system for communicating data at lower, safer, energy levels while maintaining the ability to transmit data across long distances at high speeds.

SUMMARY OF THE GENERAL INVENTIVE CONCEPT

The transmission circuit for use in hazardous or nonhazardous environments is preferably an active DC power source switched between two positive low current levels so that some current flows at all times. The current level differences are then sent through a copper wire cable pair and detected at the remote end in an optically isolated device on the receiver circuit. In the preferred embodiment, the developed switched voltage difference is then presented to a voltage comparator referenced to the average level of the switched source. The comparator is switched ON when the received signal is above the average level and OFF when below it. The comparator output is then buffered and sent to the output as an optically isolated logic level signal.

In the preferred embodiment, the present invention is comprised of a transmission circuit in a first location for transmitting a signal; a receiver circuit in a second location for receiving the transmitted signal, and where the receiver circuit is comprised of: a.) an averaging circuit for producing an output representing an average level of the received signal; and b.) a comparator for comparing the average level of the received signal with the received signal, wherein the comparator is switched on when the received signal is above the average level and turned off when the received signal is below the average level; and wherein the output of the comparator represents the signal transmitted from the transmission circuit.

In one embodiment, the transmission circuit is comprised of a switch between two positive low current levels so some current flows at all times through the transmission circuit. In one embodiment, the transmission circuit is comprised of a first switch connected to a first transmit loop line; a second switch connected to a second transmit loop line; and wherein the first and second switches are controlled by the signal to be transmitted; and wherein the first and second switches are switched at the same time so that the voltage between the first and second transmit loop lines remains the same.

In one embodiment, the receiver circuit is further comprised of an optical coupler for isolating the transmission circuit placed in a hazardous environment from the receiver circuit. The optical coupler is preferably comprised of an optically isolated photodiode; and a transistor coupled to the optically isolated photodiode. The receiver circuit is adapted to reconstruct the transmitted signal by negating the effect of cable resistance, capacitance and inductance and induced voltage noise.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The present invention relates to a data communication circuit and system for use in hazardous or nonhazardous environments. In the preferred embodiment, the system is a bi-directional (data is communicated both ways), low energy, current loop data communication circuit primarily for high speed data communications via parallel or twisted pair conductors. In the preferred embodiment, the system of the present invention can safely transmit data across distances up to 1000 feet (300 meters) in an explosive atmosphere. The circuit parameters are intrinsically safe even though this circuitry could be used in nonhazardous areas. The circuit preferably allows multiple communication circuits to be contained within a single cable without crosstalk interference. Further protections can be provided by optically isolating a portion of the circuit for use in the hazardous area with the circuit for use in the safe area.

Figure 1:
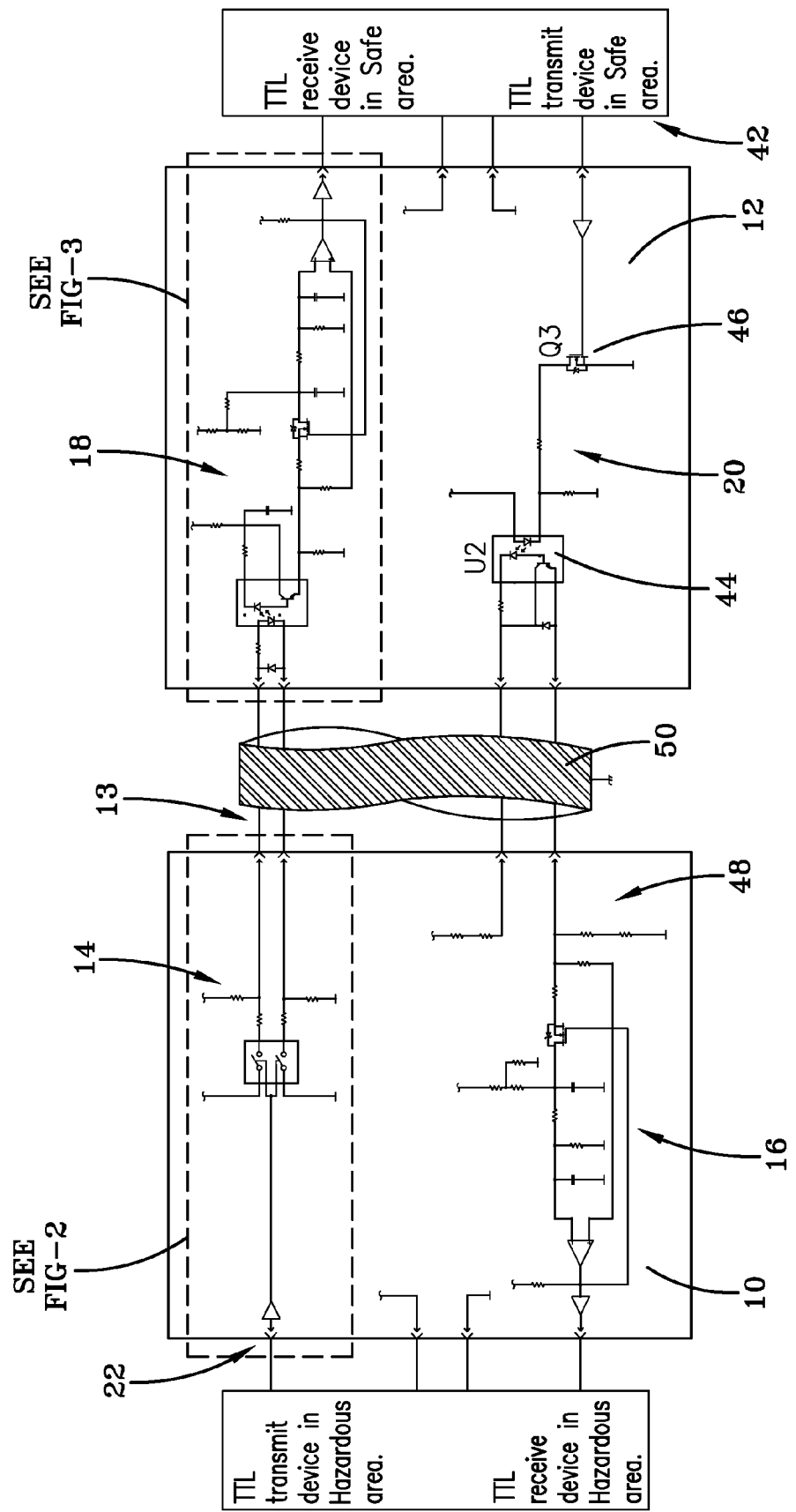
FIG. 1 illustrates one embodiment of the bi-directional data communication system of the present invention.

FIG. 1 illustrates one embodiment of the bi-directional data transmission system of the present invention. In one embodiment of the invention, the system is a bi-directional system having:

1) a first electrical circuit 10 for placement in a first location for transmitting signals to a second location and for receiving signals from the second location; and
2) a second electrical circuit 12 for placement in the second location for receiving signals from the first circuit and for transmitting signals to the first circuit.

In the preferred embodiment, the first location is a hazardous area and the second location is a safe area, wherein the first circuit is connected to the second circuit by parallel or twisted pair electrical conductors 13. Accordingly, in the bi-directional system of FIG. 1, the first circuit has a transmission circuit shown generally at 14 and a receiving circuit shown generally at 16. The second circuit also has a receiving circuit shown generally at 18 and a transmission circuit shown generally at 20. In the preferred embodiment, the first electrical circuit is housed in a box with appropriate input and outputs as described further below. Similarly, the second electrical circuit is also housed in a separate box with appropriate inputs and outputs. Alternatively, the present invention may be configured as a unidirectional communication device where the signals are only sent from one location. Furthermore, it is appreciated that the present invention may be used where both locations are nonhazardous or safe locations. (In the case of both locations being hazardous, two circuits of the type for use in hazardous areas would be required).

The transmission circuit on the first circuit is preferably an active DC power source switched between two positive low current levels so that some current flows at all times. The current level differences are then sent through a copper wire cable pair and detected at the remote end in an optically isolated device on the second circuit. In the preferred embodiment, the developed switched voltage difference is then presented to a voltage comparator referenced to the average level of the switched source. The comparator is switched ON when the received signal is above the average level and OFF when below it. The comparator output is then buffered and sent to the output as an optically isolated logic level signal.

This detection method makes the switching threshold independent of cable resistance, capacitance, inductance and circuit component variations. The low level signaling amplitudes aid high speed operation by minimizing switching slew rates and simplify the intrinsic safe considerations.

The drive signal symmetry retention is maintained by isolating the active signal from stray AC or DC connections on the cable shield or other conductors. In the preferred embodiment, because the signal levels on the two lines change simultaneously with respect to ground (one increases and the other decreases), any electromagnetic fields thus created cancel and voltages are not coupled. Any cable shield can be connected to earth or signal ground with no impact on signal shape.

In the preferred embodiment, the first electrical circuit in the hazardous location is the active side of the current loop and the second circuit in the safe location is the passive side. The active side is conditioned to be energy limited to meet ignition sage requirements.

In one embodiment, the data communication system transmits a TTL (transistor-transistor-logic) signal received from a TTL transmit device. The circuit will also work for other types of logic families, e.g., HC, HCT.

Figure 2:
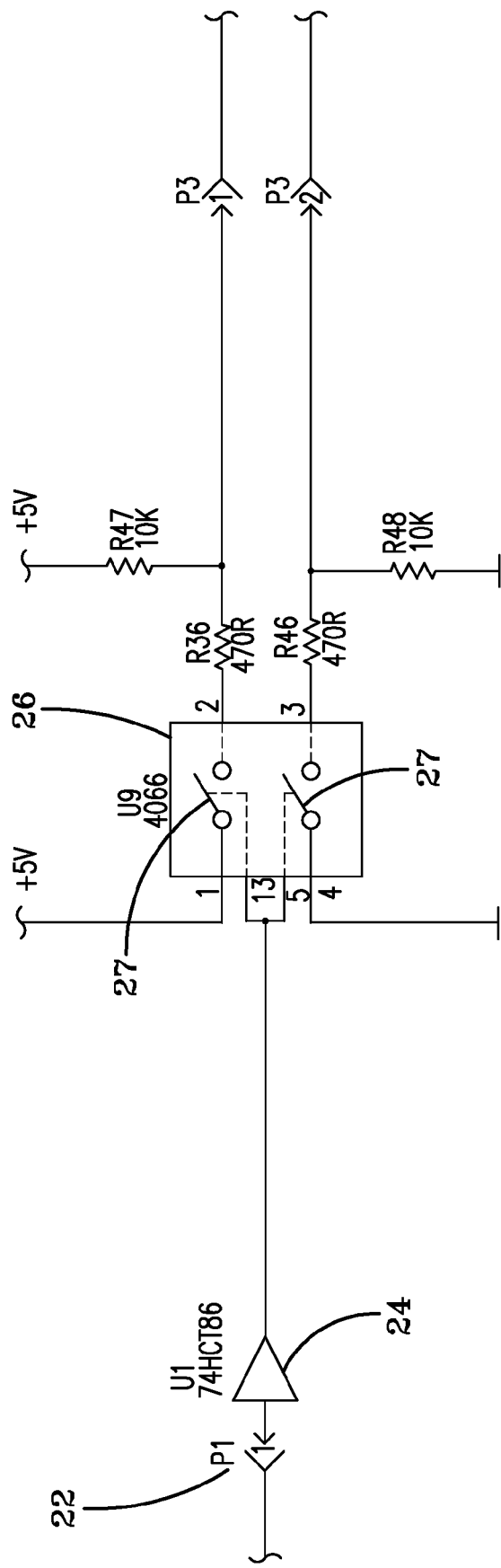
FIG. 2 illustrates a blown up view of one embodiment of the transmission circuit of the electrical circuit, which is preferably placed in the hazardous area.

FIG. 2 illustrates a blown up view of the transmission circuit of the first electrical circuit, which is preferably placed in the hazardous area. The signal to be transmitted enters inputs (at P1-1) 22 and into inverter (U1) 24. The inverter, in the preferred embodiment, serves to invert the signal if an opposite polarity signal is needed and acts as a buffer. The analog switch (U9) 26 is controlled by the transmit signal, and, in the preferred embodiment, switches the transmit current approximately between 0.12 mA and 2.7 mA. In the preferred embodiment, both of the transmit loop lines are switched 27 at the same time so that the voltage between them remains the same; only the current through them changes. This cancels any capacitive or inductive external influences and thus preserves signal wave shape. The current signal is then transmitted through the parallel or twisted pair wires to the receiver optical coupler (U5) 28 located in the safe area. A 4066 integrated circuit having bilateral switches may be used for the switch 26 where the transmit signal is connected to the control inputs for the on-chip switches.

Figure 3:
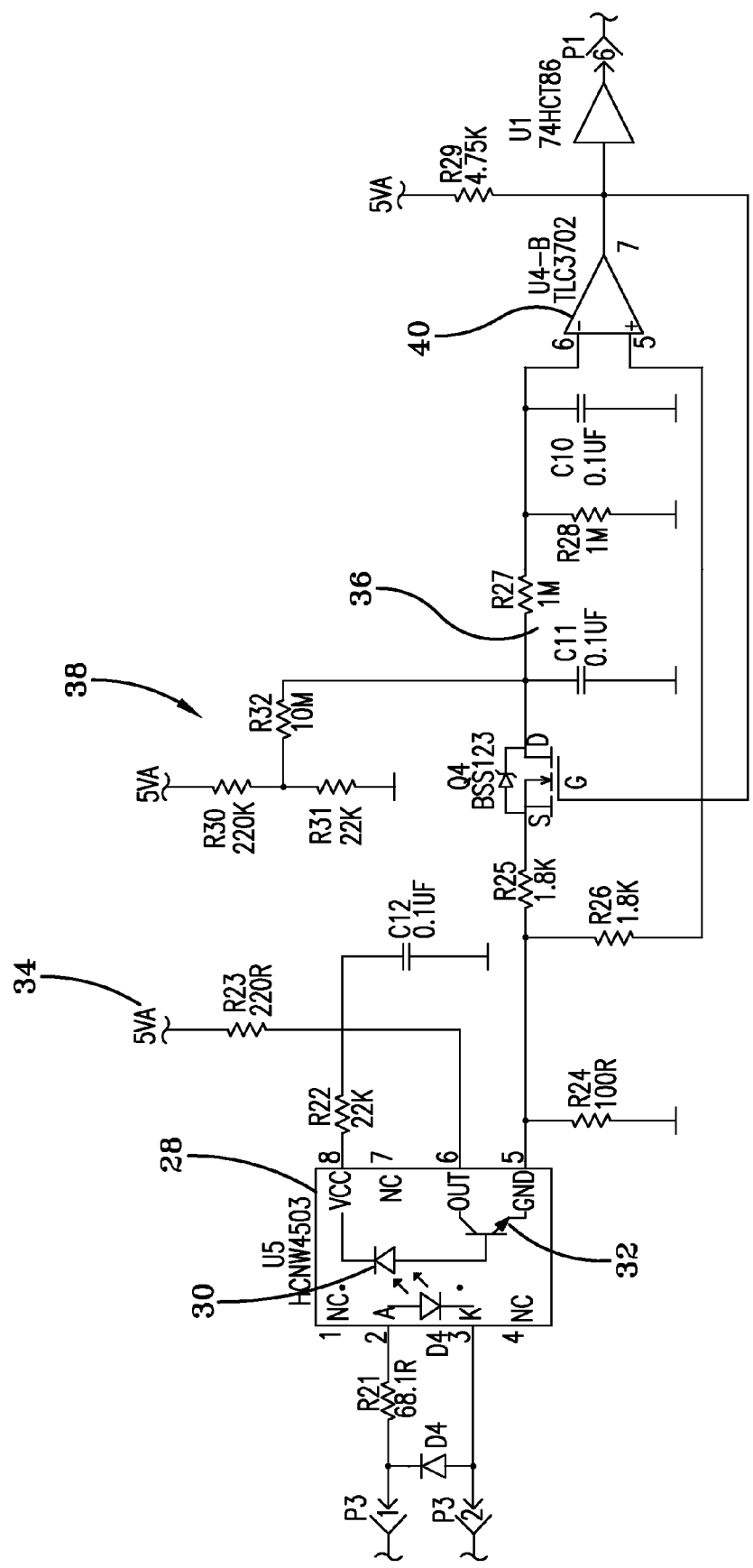
FIG. 3 illustrates a blown up view of one embodiment of the receiver circuit of the electrical circuit, which is preferably placed in the safe location.

FIG. 3 illustrates a blown up view of the receiver circuit on the second electrical circuit, which is preferably placed in the safe location. The optical coupler contains an optically isolated photodiode 30 internally coupled to a photo transistor 32 (Avago part HCNW4503). An isolated power supply is illustrated at 34. Internal and external spacing is preserved to maintain the intrinsically safe rating. This prevents a cable or transmit circuit fault from creating a hazardous spark and resulting atmosphere ignition on either side. The photodiode is preferably kept in its linear operating range by the cable current differential so it can approach its maximum design speed of 1 megabaud. The photodiode toggles the phototransistor on and off.

In the preferred embodiment of the invention, because the system is adapted to reconstruct the received signal based on a relatively small range of current change, the optical coupler is able to operate in a linear mode as opposed to a saturated mode that requires more energy and current.

The received signal then goes to an averaging circuit 36 that senses the average signal swing, which is presented to the negative (−) input of voltage comparator (U4) 40. The positive (+) input of voltage comparator receives the full voltage signal and thus it switches ON and OFF as the received signal passes above and below the average threshold. The resulting signal at the voltage comparator output accurately represents the original signal. In the preferred embodiment, the averaging circuit component values are designed for use with high speed data signals; values shown would need an alteration for lower speed signals. High speed data should be maintained as mixed high and low speed data could cause transmission errors. Biasing resistors at 38 ensure that the averaging circuit output does not go to zero, thus preventing false signals at the receiver in the event of a cable break.

In the preferred embodiment, the comparator compares the received input to the historical average of the signal therefore negating the effect of noise voltage on the cable. This allows the reconstruction of the received signals from smaller ranges of received current. Accordingly, the present invention allows the use of lower currents and energy while allowing for high speed data transmission across relatively long distances. The current output from the transmission circuit from the hazardous location can be low yet still be sufficient to transmit the data signals at high speed and across relatively long distances.

In the preferred embodiment, the transmission communication circuit from the safe area to the hazardous area is handled in a like manner except that there is no need to differentially toggle the line because there is minimal circuit distance (no external cable wiring) between the transmitter source 42 and the photodiode found in transmitter optical coupler (U2) 44. The transmit signal directly drives transistor (FET Q3) 46, which in turn directly toggles the transmitter photodiode between two positive current levels. The phototransistor in the optical coupler drives the copper wire pair using the voltage source provided by the equipment in the hazardous area. In the preferred embodiment, four 27 ohm resistors, shown generally at 48, split the 5 volt source equally so the average voltage stays close to 2.5 volts. In this circuit, the optical coupler is driving the cable so the signal excursion should be kept low to preserve the data slew rate. The same averaging/comparison function previously discussed is used in receiving circuit of the first electrical circuit in the hazardous location so the low level signal can also be detected.

Since both transmit and receive lines are actually transmission lines, impedance parameters should be taken into consideration. At least one end of each cable pair should be terminated with an impedance close to the actual line impedance. Most parallel and twisted pair lines fall into the range of about 80 to 150 ohms so the four 27 ohm resistors on the return lines represent a total impedance of about 108 ohms, which is close to the line impedance.

This circuit of the preferred embodiment has been tested at a data rate of 110 kilobaud but is useable beyond 500 KB. It is conceivable that the maximum optical coupler speed of 1 megabaud could be achieved.

Shielded 50 or unshielded twisted pair or parallel wires can be used without causing data errors. Poor field wiring and grounding is reasonably tolerated, which makes this circuit particularly attractive.

The optical isolation provided further simplifies external field circuit wiring by preventing ground loops normally found in other communication circuits.

While certain embodiments of the present invention are described in detail above, the scope of the invention is not to be considered limited by such disclosure, and modifications are possible without departing from the spirit of the invention as evidenced by the following claims:

What is claimed is:

1. A data communication system, comprising:
   a first transmission circuit in a first location for transmitting a signal;
   a first receiver circuit in a second location for receiving the transmitted signal, the first receiver circuit comprised of:
   a. an averaging circuit receiving said transmitted signal through a switch for producing an average signal representing an average level of the transmitted signal received by the first receiver circuit; and
   b. a comparator for comparing the average level of the average signal with the transmitted signal received by the first receiver circuit, wherein the comparator is turned on when the transmitted signal received by the first receiver circuit is above the average level and turned off when the transmitted signal received by the first receiver circuit is below the average level, wherein the switch is responsive to a feed back control signal from an output of the comparator that controls the switching of the transmitted signal received by the first receiver circuit through the switch to the averaging circuit;
   wherein the output of the comparator represents the signal transmitted from the first transmission circuit.

2. A data communication system according to claim 1, wherein the first transmission circuit is comprised of:
   a switch between two positive low current levels so some current flows at all times through the first transmission circuit.

3. A data communication system according to claim 1, wherein the first transmission circuit is comprised of:
   a first switch connected to a first transmit loop line;
   a second switch connected to a second transmit loop line; and
   wherein the first and second switches are controlled by the signal to be transmitted, and wherein the first and second switches are switched at the same time so that the voltage between the first and second transmit loop lines remains the same.

4. A data communication system according to claim 3, wherein the first transmission circuit is adapted to transmit signals at high speeds at current levels below standard ignition levels.

5. A data communication system according to claim 4, wherein the first receiver circuit is adapted to reconstruct the transmitted signal from the first transmission circuit at a distance of 1000 feet between the first transmission circuit and the first receiver circuit.

6. A data communication system according to claim 1, wherein the first receiver circuit is further comprised of:
   an optical coupler for isolating the first transmission circuit from the first receiver circuit.

7. A data communication system according to claim 6, wherein the optical coupler is further comprised of:
   an optically isolated photodiode; and
   a transistor coupled to the optically isolated photodiode.

8. A data communication system according to claim 1, wherein the first receiver circuit is adapted to reconstruct the transmitted signal by negating the effect of cable resistance, capacitance, inductance and voltage noise.

9. A data communication system according to claim 1, wherein the system is a bi-directional data communication system.

10. A data communication system according to claim 1, wherein the transmitted signal is a TTL (transistor-transistor-logic) signal received from a TTL transmit device.

11. A data communication system according to claim 1, wherein the system is adapted to transmit signals at high speeds from a hazardous location using low current levels.

12. A data communication receiver, comprising:
    a first receiver circuit adapted to receive a transmitted signal sent from a first transmission circuit located remotely from the first receiver circuit, the first receiver circuit comprised of:
    a. an averaging circuit receiving said transmitted signal through a switch for producing an average signal representing an average level of the transmitted signal received by the first receiver circuit; and
    b. a comparator for comparing the average level of the average signal with the transmitted signal received by the first receiver circuit, wherein the comparator is turned on when the transmitted signal received by the first receiver circuit is above the average level and turned off when the transmitted signal received by the first receiver circuit is below the average level, wherein the switch is responsive to a feed back control signal from an output of the comparator that controls the switching of the transmitted signal received by the first receiver circuit through the switch to the averaging circuit;
    wherein the output of the comparator represents the signal transmitted from the first transmission circuit.

13. A data communication receiver according to claim 12, wherein the first receiver circuit is adapted to reconstruct the transmitted signal from the first transmission circuit at a distance of 1000 feet between the first transmission circuit and the first receiver circuit.

14. A data communication receiver according to claim 12, wherein the first receiver circuit is further comprised of:
    an optical coupler for isolating the first transmission circuit from the first receiver circuit.

15. A data communication receiver according to claim 14, wherein the optical coupler is further comprised of:
    an optically isolated photodiode; and
    a transistor coupled to the optically isolated photodiode.

16. A data communication receiver according to claim 12, wherein the first receiver circuit is adapted to reconstruct the transmitted signal by negating the effect of cable resistance, capacitance, inductance and voltage noise.

17. A data communication transmitter, comprising:
    a first transmission circuit in a first location for transmitting a signal to a first receiver circuit in a second location for receiving the transmitted signal, the first receiver circuit comprised of:
    a. an averaging circuit receiving said transmitted signal through a switch for producing an average signal representing an average level of the transmitted signal received by the first receiver circuit; and b. a comparator for comparing the average level of the average signal with the transmitted signal received by the first receiver circuit, wherein the comparator is turned on when the transmitted signal received by the first receiver circuit is above the average level and turned off when the transmitted signal received by the first receiver circuit is below the average level, wherein the switch is responsive to a feed back control signal from an output of the comparator that controls the switching of the transmitted signal received by the first receiver circuit through the switch to the averaging circuit;

wherein the output of the comparator represents the signal transmitted from the first transmission circuit.

18. A data communication transmitter according to claim 17, wherein the first transmission circuit is comprised of:

a first switch connected to a first transmit loop line;

a second switch connected to a second transmit loop line; and wherein the first and second switches are controlled by the transmitted signal, and wherein the first and second switches are switched at the same time so that the voltage between the first and second transmit loop lines remains the same.

19. A data communication transmitter according to claim 17, wherein the first transmission circuit is adapted to transmit signals at high speeds at current levels below standard ignition levels.

* * * * *